United States Patent
Zettel et al.

(10) Patent No.: US 9,045,134 B2
(45) Date of Patent: Jun. 2, 2015

(54) METHOD AND SYSTEMS FOR EMISSIONS COMPLIANT USE OF TELEMATICS INPUTS TO A PROPULSION CONTROL SYSTEM FOR FUNCTION ENABLEMENT

(71) Applicant: GM Global Technology Operations LLC, Detroit, MI (US)

(72) Inventors: Andrew M. Zettel, Port Moody (CA); Norman J. Weigert, Whitby (CA); Mark A. Manickaraj, Ajax (CA); Curtis L. Hay, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/952,437

(22) Filed: Jul. 26, 2013

(65) Prior Publication Data
US 2015/0032310 A1   Jan. 29, 2015

(51) Int. Cl.
G01S 19/00     (2010.01)
B60W 20/00    (2006.01)
B60W 10/06    (2006.01)
B60W 10/08    (2006.01)

(52) U.S. Cl.
CPC ............. *B60W 20/104* (2013.01); *B60W 10/06* (2013.01); *B60W 10/08* (2013.01); *Y10S 903/93* (2013.01); *B60W 20/1082* (2013.01); *Y02T 10/62* (2013.01); *B60W 2550/402* (2013.01); *B60L 2240/622* (2013.01)

(58) Field of Classification Search
CPC . B60W 20/1082; B60W 20/40; B60W 20/10; B60W 2550/402; B60W 2710/06; B60K 6/22; Y10S 903/902; Y02T 10/62; B60L 2240/622
See application file for complete search history.

(56) References Cited

U.S. PATENT DOCUMENTS

| | | | | |
|---|---|---|---|---|
| 5,983,156 A | * | 11/1999 | Andrews | 701/115 |
| 2005/0251299 A1 | * | 11/2005 | Donnelly et al. | 701/19 |
| 2008/0288132 A1 | * | 11/2008 | King et al. | 701/22 |
| 2011/0071701 A1 | * | 3/2011 | Holub et al. | 701/2 |
| 2011/0166740 A1 | * | 7/2011 | Desborough | 701/33 |

FOREIGN PATENT DOCUMENTS

GB    2390438 A   *   1/2004

\* cited by examiner

*Primary Examiner* — Michael J Zanelli
(74) *Attorney, Agent, or Firm* — Ingrassia Fisher & Lorenz, P.C.

(57) ABSTRACT

Systems and methods are provided to allow for reliable consumption of GPS and Map information into a Control System, for such uses as improving off cycle fuel economy in a plug in hybrid vehicle with an electric motor, and an internal combustion engine using a global position system (GPS) is provided. The system comprises a global position system (GPS), a clock, and a processor containing a function executing therein that controls the internal combustion engine based on a GPS fix and its Accuracy Information (VDOP/HDOP/Satellite Quantity).

20 Claims, 3 Drawing Sheets

METHOD AND SYSTEMS FOR EMISSIONS COMPLIANT USE OF TELEMATICS INPUTS TO A PROPULSION CONTROL SYSTEM FOR FUNCTION ENABLEMENT

TECHNICAL FIELD

The technical field generally relates to the emissions efficient operation of a plug in hybrid electric vehicle (PHEV) or Extended Range Electric Vehicle (EREV). Specifically, systems and methods are provided to reduce emissions upon the startup of an internal combustion engine by modifying or disabling some systems using global positioning systems (GPS) based methods and/or geographical map data and used to predict the need of an internal combustion engine or the lack of a need thereof. Noteworthy emissions are typically Hydrocarbons (HC), Carbon Monoxide (CO), Nitrous Oxides (NOx), and Greenhouse Gases (CO2/GHG).

BACKGROUND

The use of hybrid drive vehicles is becoming more common. Hybrid drive vehicles typically utilize their electric battery until road conditions or a low battery charge necessitates the use of the alternate internal combustion engine. Exemplary road conditions requiring an internal combustion engine may include a steep grade, fast acceleration requirements, long distances at high speed as well as merely reaching a low battery charge with normal use.

Contrarily, an internal combustion engine is not necessary when moving downhill. In fact, such a situation is an electric charging opportunity for a hybrid vehicle.

It is a fact of physics that a cold start of an internal combustion engine is fuel and emissions inefficient as some fuel is wasted as the fuel and combustion cycle starts. Similarly, emissions at startup are at their least efficient because engine and emissions components are not at efficient operating temperatures.

New "off board inputs" like GPS and mapping data are now available that can dramatically improve the emission performance of hybrid vehicles by the advance start of chosen systems by foretelling their used using GPS information. However, a problem is that many of these input systems are neither monitored nor diagnosed by the emissions control system. Thus, reliability in-use during both failed and non-failed conditions of these systems or upstream pre-requisite systems is questionable. Thus, it is desirable to develop a method/apparatus to certify Telematics/Position inputs to the propulsion control system to advance start, and provide a relatively consistent performance to those inputs. For example, because many customers drive their vehicles in very repetitive drive routes, it is important for the enablement of a given feature be consistent, and communicated to the driver, so if an engine start decision changes, a customer will take note of possible things that may have contributed to the enablement of the algorithm (heavy rain affecting GPS reception, etc.). Similarly, from the perspective of the automaker, it is desirable that sufficient accuracy is present in the inputs to control before controls operation is modified.

As such, it is also desirable to anticipate the need (or lack thereof) for an internal combustion engine start so that the internal combustion engine may be prepared in advance of its need thereby allowing the start process to be performed in the most efficient manner. Herein, various methods for enabling/ disabling functions for control of internal combustions engines using GPS are disclosed.

Further, other desirable features and characteristics of the present invention will become apparent from the subsequent detailed description and the appended claims, taken in conjunction with the accompanying drawings and the foregoing technical field and background.

SUMMARY

A system for improving off cycle fuel economy in a hybrid vehicle with an electric motor and an internal combustion engine using a global position system (GPS) is provided, the system comprises a global position system (GPS), a clock, and a processor containing a function executing therein that controls the internal combustion engine based on a GPS fix.

A method for improving off cycle fuel economy in a hybrid vehicle with an electric motor and an internal combustion engine using a global position system (GPS) is provided. The method comprises receiving a global positioning system (GPS) fix, receiving map data, and determining a horizontal dilution of precision (HDOP) of the GPS fix. For a given internal combustion engine control function, determining when the HDOP exceeds a predetermined threshold. When the HDOP does not exceed its predetermined threshold, then the internal combustion engine control function enabled or is maintained enabled.

Furthermore, other desirable features and characteristics of the [system/method] will become apparent from the subsequent detailed description and the appended claims, taken in conjunction with the accompanying drawings and the preceding background.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
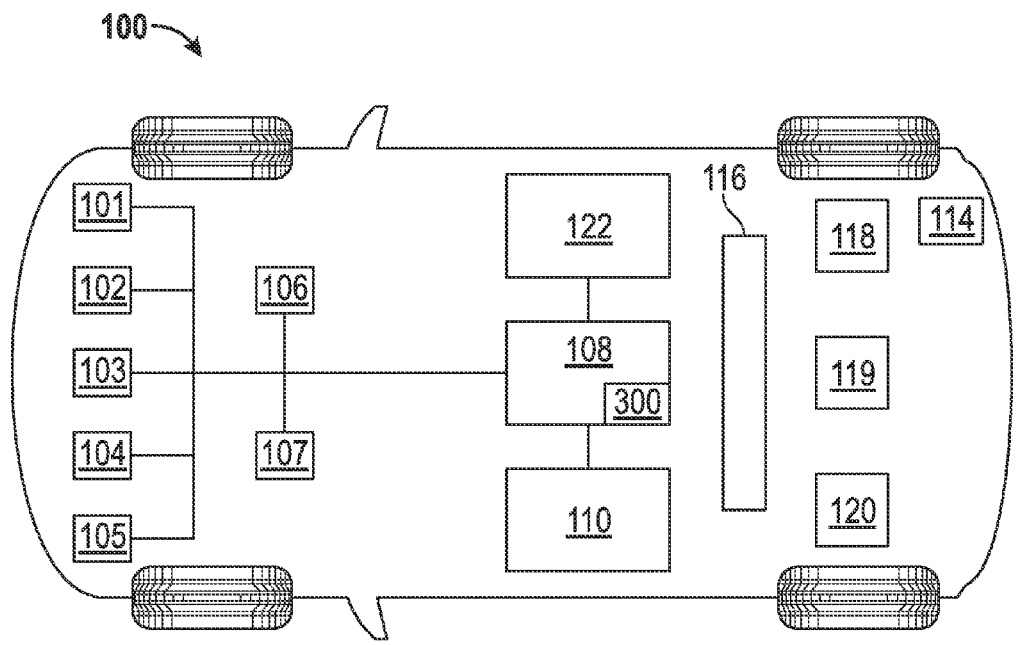
FIG. 1 is a schematic representation of an example embodiment of a plug-in electric vehicle that incorporates an embodiment of a GPS enablement system.

The various illustrative components and logical blocks described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. Software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Further, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

FIG. 1 is a schematic representation of an example embodiment of a plug-in electric vehicle 100 that incorporates an embodiment of a GPS enablement system 300, as described in more detail below. In the exemplary embodiment illustrated in FIG. 1, vehicle 100 is a plug-in fully electric vehicle or a plug-in hybrid electric vehicle having an electric traction system. According to various embodiments, the term "plug-in," as applied to a vehicle, means a vehicle having at least a DC energy source (e.g., DC energy source 110) and a hardware interface (e.g., AC power interface 114), where the hardware interface is adapted to connect with an external load (e.g., an electricity-consuming device) or a utility alternating current (AC) outlet in order to charge the DC energy source using power supplied by the electric utility.

Vehicle 100 may be any one of a number of different types of automobiles, such as, for example, a sedan, a wagon, a truck, or a sport utility vehicle, and may be two-wheel drive (i.e., rear-wheel drive or front-wheel drive), four-wheel drive, or all-wheel drive. Vehicle 100 may also incorporate any one of, or combination of, a number of different types of engines and/or traction systems, such as, for example, a gasoline or diesel fueled combustion engine, a "flex fuel vehicle" engine (i.e., using a mixture of gasoline and alcohol), a gaseous compound (e.g., hydrogen and natural gas) fueled engine, a combustion/electric motor hybrid engine, and an electric motor.

According to various embodiments, vehicle 100 includes one or more electronic control systems 108, one or more DC energy sources 110, one or more AC power interfaces 114, one or more inverter systems 116, and one or more electric motors 118, 119, 120. In embodiments in which vehicle 100 is a hybrid electric vehicle, vehicle 100 also may include an engine 122 (e.g., an internal combustion engine). Although only one each of electronic control system 108, DC energy source 110, AC power interface 114, and inverter system 116 is illustrated in FIG. 1, more than one (e.g., two or three) of any one or more of these components may be included in vehicle 100, in other embodiments. In addition, although three motors 118, 119, 120 are illustrated in FIG. 1, system 100 may include one, two, or more than three motors, in other embodiments.

In some embodiments, the engine 122 is designed as the back up traction source such that the engine 122 is normally idle and off line. When the SOC of the DC energy source 110 deteriorates to a predefined level or a geographic circumstance occurs that overcomes the motor 118 ability to operate, a command from the ECU 108 causes the engine 122 to start, which entails at least beginning fuel flow and initiating auxiliary services. When the Engine 122 achieves a power state in which it may relieve the motor 118, the motor is engages with the drive train (not shown) to drive the wheels. The motor may be disengaged or may assume the role of an electric generator to begin recharging the DC energy source 110.

In some embodiments, particularly in series-type hybrid electric vehicles, vehicle 100 may include a first motor 118 or "drive motor" adapted to provide drive power to wheels through its electrical coupling with a traction system of the vehicle (e.g., to propel the vehicle), and a second motor 119 or "alternator" adapted to function as an alternator for cranking the internal combustion engine (or other type of engine) when starting and/or to provide additional mechanical power to the traction system for accelerating. In other embodiments, particularly in parallel-type hybrid electric vehicles, vehicle 100 may include a single motor 118 adapted to provide drive power and also to function as an alternator. In still other embodiments, particularly in power split-type hybrid electric vehicles (also referred to as series-parallel-type hybrid electric vehicles), vehicle 100 may include a first motor 118 adapted to provide drive power, a second motor 119 adapted to function as an alternator, and a third motor 120 adapted to function as an auxiliary motor (e.g., to provide power to an electric pump, AC compressor or other vehicle component).

In an embodiment, each motor 118-120 may include a three-phase alternating current (AC) electric motor, although other types of motors having a different number of phases may be employed. As shown in FIG. 1, motor 118 may also include or cooperate with a transmission such that motor 118, engine 122 and the transmission are mechanically coupled to at least some of the vehicle's wheels through one or more drive shafts (not illustrated).

Electronic control system 108 is in operable communication with motors 118-120, DC energy source 110, and inverter system 116. The electronic control system 108 may include various sensors and automotive control modules, or electronic control units (ECUs), at least one processor, and/or a memory (or other computer-readable medium) which includes instructions stored thereon for carrying out the processes and methods as described below. Exemplary sensors that may be found useful include wheel sped sensors 101, steering angle sensor 102, a gyroscope 103, a GPS receiver system 104 and antenna, a clock 105 (or CDMA time 105a for "Onstar"®), and mapping database 106 or a communication system capable of retrieving mapping data from an outside source in real time.

DC energy source 110 may include one or more rechargeable batteries, battery packs, fuel cells, supercapacitors, or the like. DC energy source 110 is in operable communication with and/or electrically coupled with electronic control system 108 and to inverter system 116. In embodiments in which vehicle 100 includes multiple DC energy sources 110, a first DC energy source 110 may have a first nominal operating voltage (e.g., in a range of 42 to 350 volts), and other DC energy sources may have different nominal operating voltages (e.g., in a range of 12 to 42 volts).

AC power interface 114 is in operable communication with and/or electrically coupled with inverter system 116. AC power interface 114 includes a hardware interface that is adapted to couple with an electric utility or other external load in order to exchange AC power with the electric utility or other external load. In an embodiment, AC power interface 114 includes a junction box that is adapted to receive an electrical plug that is electrically coupled with or connectable to a utility AC outlet or an external load.

In an alternate embodiment, AC power interface 114 includes an electrical plug that is adapted to be inserted into a junction box (e.g., an electrical socket, not illustrated), where the junction box is electrically coupled with or connectable to an electric utility or other external load. More particularly, in various embodiments, AC power interface 114 includes a hardware interface selected from a group of hardware interfaces that includes a two-conductor AC power interface, a three-conductor AC power interface, a single-phase junction box, a two-phase junction box, a three-phase junction box, a single-phase plug, a two-phase plug, and a three-phase plug.

At various times, vehicle 100 may be in either a propulsion state or a parking state. In either state, various system components may interoperate as a vehicular power processing system. More particularly, a vehicular power processing system may include one or more DC link capacitors (not illustrated), electronic control systems 108, DC energy sources 110, AC power interfaces 114, inverter systems 116, sensors (101-106) and motors 118-120, among other things. Various embodiments of vehicular power processing systems will be described infra.

While in the propulsion state, vehicle 100 may be stationary or moving, and the AC power interface 114 is disconnected from any electric utility or external load. In the propulsion state, the power processing system provides a electric drive function, in which inverter system 116 may draw DC power from DC energy source 110, convert the DC power to AC waveforms, and provide the AC waveforms to motors 118-120, in order to propel the vehicle, to provide alternator power, and/or to provide auxiliary power. Alternatively while in the propulsion state, the geographic situation and the battery SOC may require the vehicle to start and shift propulsion to the engine 122, which requires the engine 122 to be started and brought on line in am efficient and indiscernible manner.

While in the parking state, vehicle 100 is stationary and the AC power interface 114 is coupled with an electric utility and/or another type of external load (e.g., via a physical coupling between a junction box and a plug). While in the vehicle parking state, vehicle 100 may be in either a charging mode or a power processing mode, according to various embodiments.

In the charging mode, the power processing system provides a charging function, in order to charge the vehicle's DC energy source 110 (e.g., a battery) by drawing power from an electric utility in order to recharge the DC energy source 110, according to an embodiment. Conversely, in the power processing mode, the power processing system functions to discharge the vehicle's DC energy source 110 by drawing power from the DC energy source 110, and supplying that power to the electric utility, according to another embodiment.

More specifically, when vehicle 100 is in the charging mode, inverter system 116 may provide a charging function by receiving AC power from the electric utility via one or more motors 118-120 and the AC power interface 114, converting the received AC power to DC power, and recharging DC energy source 110 with the DC power. Accordingly, vehicle 100 may function to recharge a DC energy source 110 while vehicle 100 is in the charging mode.

While in the power processing mode, and according to various embodiments, the system components (e.g., inverter system 116 and motor(s) 118-120) may be operable to provide any one or more functions selected from a group of functions that includes, but is not limited to, a stand-alone AC power source function, a utility-interconnected active power generator function, a utility-interconnected reactive power generator function, and/or a utility-interconnected active power filter function. Any one or more of these functions may be provided through control of the system components by an electronic control system 108. In other words, an electronic control system 108 may execute instructions that cause electronic control system 108 to supply control signals to the system components in a manner that causes the system components to provide one or more of the above functions.

According to various embodiments, when vehicle 100 in the power processing mode, inverter system 116 may operate to draw DC power from DC energy source 110, to convert the DC power to AC power, and to supply the AC power to an external load (e.g., an electric utility or another type of load) via one or more motors 118-120 and AC power interface 114. In addition, when vehicle 100 is in the power processing mode and is providing a utility-interconnected reactive power generator function, inverter system 116 also may operate to draw AC power from an electric utility via one or more motors 118-120 and AC power interface 114, to convert the AC power to DC power, and to provide the DC power to DC energy source 110.

In an embodiment, vehicle 100 automatically may switch between the charging mode and the power processing mode based on various factors such as, for example, the state of charge (SOC) of the battery and/or the time of day. For example, vehicle 100 may be programmed not to switch to the power processing mode when the SOC of the battery is below a first threshold. As another example, vehicle 100 may be programmed automatically to switch from the power processing mode to the charging mode when the SOC of the battery is below a second threshold, which may be the same as or different from the first threshold. As yet another example, vehicle 100 may be programmed automatically to switch to the power processing mode at a first time of day (e.g., to supply power to a utility during a peak usage time period) and to switch to the charging mode at a second time of day (e.g., to draw power from the utility during a non-peak usage time period). In addition or alternatively, a user may cause vehicle 100 to switch to either the charging mode or the power processing mode by providing a user input through a user interface device that provides the user with the option to choose the mode.

Embodiments described in detail herein indicate that some or all of the same system components (e.g., inverter system 116, motor(s) 118-120, Engine 122, DC link capacitors (not illustrated)) may be used in both the propulsion state and the parking state in order to provide drive power to the vehicle's traction system, to charge the DC energy source 110 (e.g., in the charging mode), or to supply AC electric power (e.g., in the power processing mode). It is to be understood that, in other embodiments, vehicle 100 may include distinct system components for use in either the propulsion state or the parking state. Further, vehicle 100 may include distinct system components for use during either the charging mode or the power processing mode.

Figure 2:
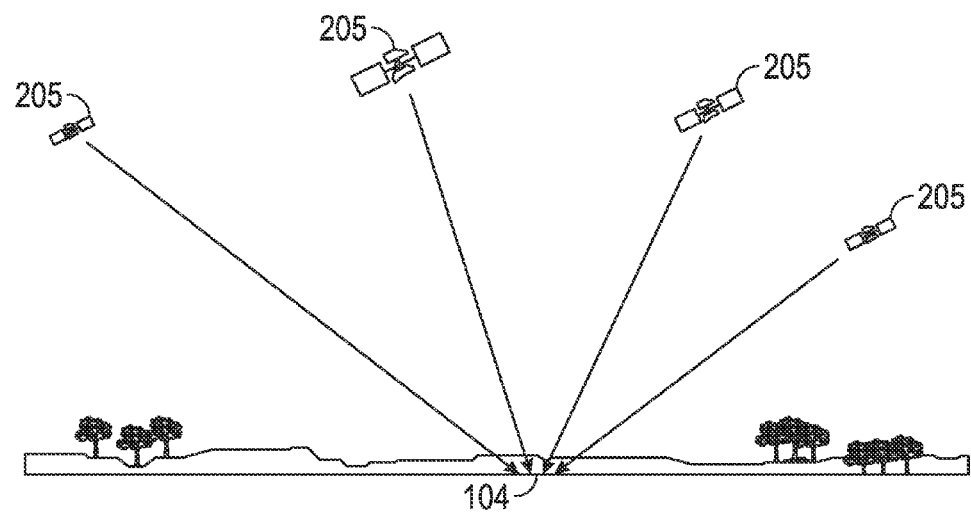
FIG. 2 depiction of a GPS satellite system comprising a number of ubiquitous GPS satellites and the GPS receiver.

FIG. 2 is a depiction of a GPS satellite system 200 comprising a number of ubiquitous GPS satellites 205 and the GPS receiver 104 (See, FIG. 1). As is well known in the art, a position of the GPS receiver 104 is determined by taking a bearing on a plurality of visible GPS satellites. Where the bearing lines cross is the position of the GPS receiver 104. The techniques for taking a geographic fix using GPS is well known in the art and will not be discussed further herein.

Figure 3:
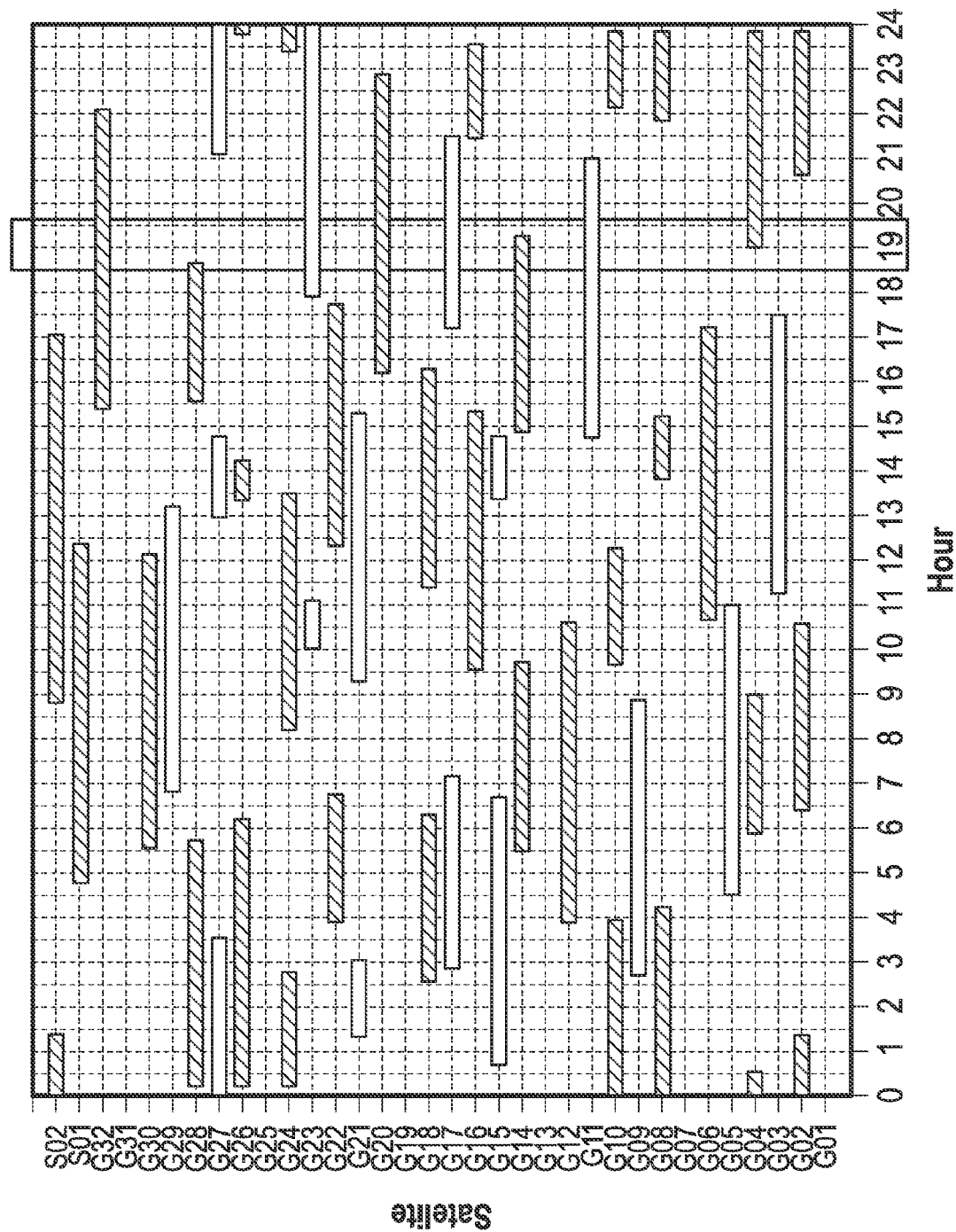
FIG. 3 exemplary graph of satellite visibility for a particular location.

FIG. 3 is an exemplary graph of satellite visibility for a particular location. As can be seen, at hour 15 (on the axis, eight satellites (8) are visible to a GPS system with satellite G004 just appearing and satellite G028 just receding.

The more satellites that are visible and the more dispersed the satellites are in the sky, the more accurate the geographic fix is. In other words the lower the "dilution of precision" ("DOP") is. Obviously the loss of some or all of GPS satellite signals, or the more closely co-located the satellites are in the sky, the less accurate the higher the DOP of the geographic fix is. For vital functions depending on a very accurate fix (0-7 feet) any material degradation of the geographic fix may lead to unwanted or hazardous performance of a vehicle containing the GPS receiver 104. Hence, in certain circumstances it is preferable to suspend certain algorithms or operations using a high fidelity GPS position fix instead of using a degraded or missing fix. With other algorithms and operations requiring low infidelity GPS, a degraded fix may (10-100 feet) still be acceptable and/or a dead reckoning system 107 using on data in a mapping database 106 may suffice for normal operation. A "fix" is a position derived from measuring external reference points such as GPS satellites.

Further multi-path errors can also degrade GPS positioning. Multi-path Errors result from the delayed receipt of an ambiguous GPS signal because it has reflected off a building or natural obstacle, thereby confusing the GPE receiver. Multi-path errors may be remedied using Kalman filters. Kalman filters are well known in the art and will not be discussed further herein in the interest of clarity and brevity.

Figure 4:
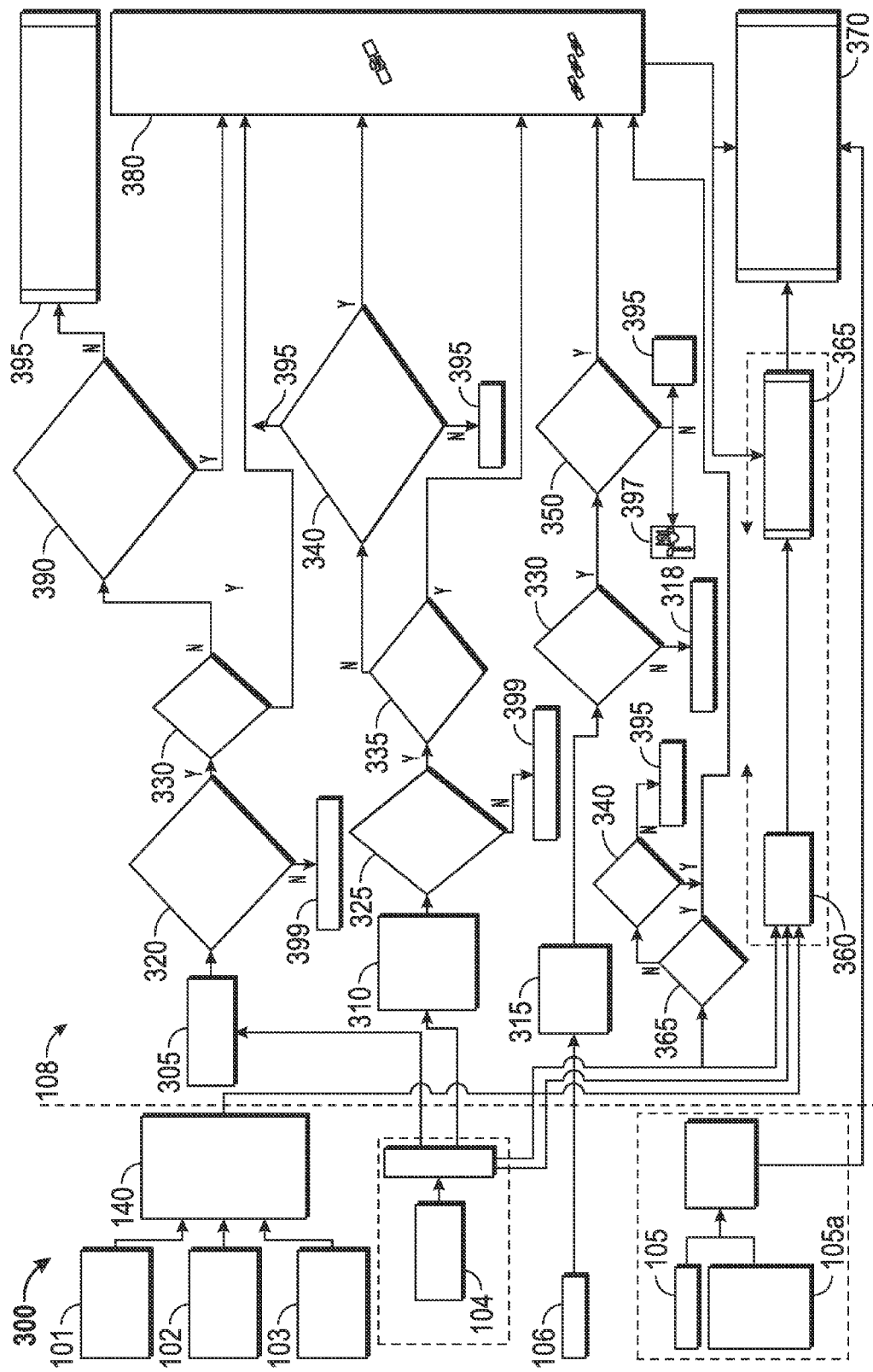
FIG. 4 a simplified functional block diagram of a system that is configured to disable some high fidelity vehicle functions when a GPS fix becomes degraded.

FIG. 4 is a simplified functional block diagram of a system 300 that is configured to disable some high fidelity vehicle functions when a GPS fix becomes degraded, including shutting down an internal combustion engine. When a GPS system becomes degraded, a backup dead reckoning system is used as a standby for some systems. A dead reckoning system is one that extrapolates a current position for the last known fix based on the course and speed of a vehicle since its last fix. The concept of dead reckoning and systems therefore are old in the art and will not be discussed further herein in the interest of clarity and brevity. However, the wheel speed sensor 101, steering angle sensor 102 and any gyroscope or other inertial sensors 103 all provide input to the dead reckoning system 140.

A GPS fix may have both a horizontal component (e.g., as on a 2-dimensional map) and an altitude component. At processes 305 and 310, a Horizontal Dilution of Precision (HDOP) and a Vertical Degree of Precision (VDOP) are calculated. The HDOP and VDOP are a measure of the degradation of the horizontal and/or vertical component of a fix due the degradation of the number, positioning, operational status and quality of signal from a sub-constellation of visible GPS satellites. HODP and VODP are well know concepts in the art and will not be discussed further in the interest of brevity and clarity.

The horizontal dilution of precision, $$HDOP = \sqrt{d_x^2 + d_y^2},$$

and the vertical dilution of precision, $$VDOP = \sqrt{d_z^2},$$

are both dependent on the coordinate system used. To correspond to the local horizon plane and the local vertical, x, y, and z should denote positions in either a north, east, down coordinate system or a south, east, up coordinate system. Where $d_x$ is the dilution in the x direction, $d_y$ is dilution in the y direction, and $d_z$ is dilution the vertical direction. The calculation of dilution in a particular direction is beyond the scope of this disclosure.

At process 315, the age of the map data available to the vehicle is determined. Map data may change frequently due to traffic bottlenecks, accidents, road construction, weather and other factors. Thus, stale map data may be problematic depending on the system needing the data. Two day old data may be unacceptable to one vehicle system/function but may be perfectly acceptable for another. At decision point 330 it is determined if the feature or function of interest needs mapping or routing data. If not, no further action is taken in this respect at process 398. When map data is required by the feature/function, the age of the map data is compared to a maximum age threshold for the feature/function at decision point 350. When the map data age exceeds the threshold, then an error is generated and the customer/driver is notified at process 397. The feature/function of interest may be disabled. If the Map data age is below the threshold then the feature function is not disabled at process 395.

At processes 320 and 325, it is determined if a vehicle system of concern needs a vertical and/or horizontal component of a geographical fix. Information from which such a determination is made is easily inserted into the system operating code by the system designer as is well known in the art. If not, the method stops at process 399.

If a horizontal component fix is required by the system of concern, then the HDOP is compared to a threshold value or a maximum value at process 330. When the HDOP is less than the threshold, the accuracy of the GPS is acceptable and the feature of interest is enabled or maintained enabled at process 380.

When the HDOP is greater than the threshold, the accuracy of the GPS is considered unacceptable. When this is the case, the method proceeds to decision point 340 where it is determined the elapsed time since the last time a good GPS fix was received. If the time is less than a predetermined threshold time for the feature/function of interest then the feature/function is enabled or maintained enabled at process 380 based on a position from the dead reckoning system 107. When the Time threshold forth feature/function of interest is exceeded, the feature of interest may be disabled at process 395. In the art, the higher the HDOP, the less accurate is the fix.

If a vertical component fix is required by the system of concern, then the VDOP is compared to a threshold value or a maximum value at process 335. The VDOP is compared to a threshold value or a maximum value. When the VDOP is less than the threshold, the accuracy of the GPS is acceptable and the feature of interest is enabled or maintained at process 380.

When the VDOP is greater (less is better) than the threshold, the accuracy of the GPS is considered unacceptable. When this is the case, the method proceeds to decision point 340 where it is determined the elapsed time since a good GPS fix was received. If the time is less than a predetermined threshold time for the feature/function of interest then the feature/function is enabled or maintained enabled at process 380 based on a position from the dead reckoning system 107. When the Time threshold forth feature/function of interest is exceeded, the feature of interest may be disabled at process 395. In the art, the higher the VDOP, the less accurate is the altitude fix.

At process 360, the location of the vehicle is determined by either of a GPS fix or a dead reckoning fix and is communicated to the feature/function that utilizes location data at process 365. When the GPS fidelity and the map data age are acceptable as determined in process 380, the feature/function is enabled or maintained enabled. The clock (105/105*a*) updates the GPS fix recentness timer at process 370.

For some features/functions, it may be known that a minimum number of GPS satellites are required to provide the location accuracy necessary to make the feature/function effective for its intended purpose. At decision point 365 it is determined if the number of satellites within operable view exceed a predefined threshold number. When the number of operably viewable GPS satellites meets or exceeds the threshold number then the features/functions of concern are enabled or are maintained enabled at process 380. When the number of operably viewable GPS satellites is less than the threshold number then the method proceeds to decision point 340 where it is determined the elapsed time since a good GPS fix was received. If the time is less than a predetermined threshold time for the feature/function of interest then the feature/function is enabled or maintained enabled at process 380 based on a position from the dead reckoning system 107. When the Time threshold forth feature/function of interest is exceeded, the feature of interest may be disabled at process 395. In the art, the lower the number of operably viewable satellites, the less accurate is the altitude fix.

As a non-limiting example to illustrate the inventive system disclosed herein. Suppose when a driver gets into his vehicle and connects the battery, a currently known position may be retrieved from a memory device (not shown). The driver may then select a driving function. A non-limiting driving function may include a "hill approach" that shuts down the internal combustion engine when approaching a material downgrade in the roadway to take advantage of battery regeneration. Because the mapping data may be stale or because the satellite fidelity is insufficient, the "hill approach" function remains disabled. During disablement of the "hill approach" function, standard internal combustion engine start/stop functions would control the engine. This is because standard start/stop functions have a lower tolerance for stale data and requires an accurate GPS location so an autostop will only be commanded when there is a high confidence the engine will not be needed.

As the driver proceeds, the GPS system may receive adequate satellite data to provide a good three dimensional fix, at which point the "hill approach" function is enabled. If for some reason, the fix is lost for a time, the dead reckoning system maintains the function enabled until the dead reckoning time threshold is exceeded, at which time, the "hill approach function would become disabled because the vehicle does not know where the hill is.

When the driver reaches a predetermined geographic point at the top of a hill with a material down slope. The "hill approach" function in effect anticipates the opportunity to use the down grade to regenerate the vehicle's battery and causes the internal combustion engine to turn off before the downgrade is encountered to provide the best regeneration opportunity and the least amount of emissions. For instance, the "hill approach" function will command an engine stop while the customer is still requiring positive axle torque (pushing the accelerator pedal), long before the driver applies the brake pedal as he crests the hill, which is when the autostop is normally commanded.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claim and the legal equivalents thereof.

What is claimed is:

1. A system for improving off cycle fuel economy or other emissions in a hybrid vehicle with an electric motor and an internal combustion engine using a global position system (GPS) comprising:
    a global position system (GPS); and
    a processor containing a function executing therein that controls the internal combustion engine based on a GPS fix, wherein the processor is configured to:
        receive a horizontal dilution of precision (HDOP);
        determine when the HDOP is below a predetermined threshold associated with the function;
        disable or maintain the function disabled when the HDOP is not below the predetermined threshold; and
        enable or maintain the function enabled when the HDOP is below the predetermined threshold.

2. The system of claim 1 wherein the processor is further configured to:
    receive a vertical dilution of precision (VDOP);
    determine when the VDOP is below a predetermined threshold associated with the function;
    disable or maintain the function disabled when the VDOP is not below the predetermined threshold; and
    enable or maintain the function enabled when the VDOP is below the predetermined threshold.

3. The system of claim 2 further including a dead reckoning system, wherein the processor is further configured to enable or maintain the function enabled when the VDOP is below the predetermined threshold based on a position from the dead reckoning system.

4. The system of claim 2, further including a dead reckoning system, wherein the processor is further configured to:
    compare an elapsed time to a predetermined maximum elapsed time threshold value when one of the HDOP and VDOP exceeds its respective predetermined threshold;
    disable or maintain the function disabled when the elapse time exceeds the predetermined maximum elapsed time threshold value; and
    utilize a dead reckoning fix from the dead reckoning system in place of the GPS fix when the elapse time does not exceed the predetermined maximum elapsed time threshold value.

5. The system of claim 4 further comprising a memory configured to store geographic map data, wherein the processor is further configured to:
determine an age of the geographic map data;
enable or maintain the function enabled when the age of the geographic map data is below a predetermined age threshold; and
disable or maintain the function disabled when the age of the geographic map data is exceeds the predetermined age threshold.

6. The system of claim 1 wherein the HDOP is a function of the number of satellites actively being tracked at the vehicle location.

7. The system of claim 1 further including a dead reckoning system, wherein the processor is further configured to enable or maintain the function enabled when the HDOP is below the predetermined threshold based on a position from the dead reckoning system.

8. The system of claim 1, where in the processor is configured to:
receive a number of satellites actively being tracked by the GPS;
determine when the number of satellites being tracked exceeds a predetermined threshold number;
disable or maintain the function disabled when the satellite quantity is below the predetermined threshold number; and
enable or maintain the function enabled when the satellite quantity is above the predetermined threshold number.

9. The system of claim 1, further comprising:
a clock used for updating the GPS fix.

10. A method for improving off cycle fuel economy or other emissions in a hybrid vehicle with an electric motor and an internal combustion engine using a global position system (GPS) comprising:
receiving a global positioning system (GPS) fix;
receiving map data;
determining a horizontal dilution of precision (HDOP) of the GPS fix;
for a given internal combustion engine control function, determining when the HDOP exceeds a predetermined threshold; and
when the HDOP does not exceed its predetermined threshold, enabling or maintain enabled the internal combustion engine control function.

11. The method of claim 10, further comprising:
determining a vertical dilution of precision (VDOP) of the GPS fix;
for a given internal combustion engine control function, determining when the VDOP exceeds a predetermined threshold; and
when the VDOP does not exceed its predetermined threshold, enabling or maintain enabled the internal combustion engine control function.

12. The method of claim 11, further comprising:
receiving a dead reckoning fix and an elapsed time since the dead reckoning fix was determined; and
when the elapsed time since the dead reckoning fix was determined is less than a predetermined elapsed time associated with the internal combustion engine control function, then enabling or maintaining enabled the internal combustion engine control function.

13. The method of claim 12, wherein when the HDOP exceeds its predetermined threshold for the associated internal combustion engine control function and the elapsed time since the dead reckoning fix was determined is greater than the predetermined elapsed time of the dead reckoning fix associated with the internal combustion engine control function, then disabling or maintain the disabled the internal combustion engine control function.

14. The method of claim 12, wherein when the VDOP exceeds its predetermined threshold for the associated internal combustion engine control function and the elapsed time since the dead reckoning fix was determined is greater than the predetermined elapsed time of the dead reckoning fix associated with the internal combustion engine control function, then disabling or maintain the disabled the internal combustion engine control function.

15. The method of claim 10, further comprising:
determining the age of the map data; and
wherein when the age of the map data is less than a predetermined age associated with the internal combustion engine control function, then enabling or maintaining enabled the internal combustion engine control function.

16. A system for improving off cycle fuel economy or other emissions in a hybrid vehicle with an electric motor and an internal combustion engine using a global position system (GPS) comprising:
a global position system (GPS); and
a processor containing a function executing therein that controls the internal combustion engine based on a GPS fix, wherein the processor is configured to:
receive a vertical dilution of precision (VDOP);
determine when the VDOP is below a predetermined threshold associated with the function;
disable or maintain the function disabled when the VDOP is not below the predetermined threshold; and
enable or maintain the function enabled when the VDOP is below the predetermined threshold.

17. The system of claim 16 wherein the VDOP is a function of the number of satellites actively being tracked at the vehicle location.

18. The system of claim 16 further including a dead reckoning system, wherein the processor is further configured to enable or maintain the function enabled when the VDOP is below the predetermined threshold based on a position from the dead reckoning system.

19. The system of claim 16, further including a dead reckoning system, wherein the processor is further configured to:
compare an elapsed time to a predetermined maximum elapsed time threshold value when the VDOP exceeds its respective predetermined threshold;
disable or maintain the function disabled when the elapse time exceeds the predetermined maximum elapsed time threshold value; and
utilize a dead reckoning fix from the dead reckoning system in place of the GPS fix when the elapse time does not exceed the predetermined maximum elapsed time threshold value.

20. The system of claim 19 further comprising a memory configured to store geographic map data, wherein the processor is further configured to:
determine an age of the geographic map data;
enable or maintain the function enabled when the age of the geographic map data is below a predetermined age threshold; and
disable or maintain the function disabled when the age of the geographic map data is exceeds the predetermined age threshold.

* * * * *